United States Patent
Perreard

(10) Patent No.: US 7,600,678 B2
(45) Date of Patent: Oct. 13, 2009

(54) METHOD OF ISSUING A TICKET PAID FOR BY ILLEGAL PAYMENT MEANS, AND A VENDING MACHINE AND TICKET READER FOR IMPLEMENTING THE METHOD

(75) Inventor: David Perreard, Montferrand le Chateau (FR)

(73) Assignee: Parkeon (FR)

( * ) Notice: Subject to any disclaimer, the term of this patent is extended or adjusted under 35 U.S.C. 154(b) by 259 days.

(21) Appl. No.: 10/561,668

(22) PCT Filed: Jun. 18, 2004

(86) PCT No.: PCT/FR2004/001540

§ 371 (c)(1),
(2), (4) Date: Mar. 29, 2007

(87) PCT Pub. No.: WO2004/114236

PCT Pub. Date: Dec. 29, 2004

(65) Prior Publication Data

US 2007/0267476 A1     Nov. 22, 2007

(30) Foreign Application Priority Data

Jun. 19, 2003    (FR) ................... 03 07426

(51) Int. Cl.
*G06F 7/08* (2006.01)

(52) U.S. Cl. ............... 235/381; 235/375; 235/491; 235/494; 283/53; 283/57; 283/58; 283/59; 283/903; 705/5

(58) Field of Classification Search ...... 235/375–382.5, 235/491, 494; 283/53, 57–59, 903; 705/5
See application file for complete search history.

(56) References Cited

U.S. PATENT DOCUMENTS

| 4,139,219 A | | 2/1979 | Herndon ............. 283/57 |
| 5,408,417 A | * | 4/1995 | Wilder ............... 705/5 |
| 5,682,819 A | * | 11/1997 | Beaty ............... 101/483 |
| 6,736,324 B2 | * | 5/2004 | Behm et al. ........ 235/487 |

FOREIGN PATENT DOCUMENTS

| DE | 10037814 | 5/2002 |
| EP | 0829826 | 3/1998 |
| FR | 2832529 | 5/2003 |
| GB | 2251110 | 6/1992 |
| WO | 0227679 | 4/2002 |

\* cited by examiner

*Primary Examiner*—Thien M. Le
*Assistant Examiner*—Tuyen K Vo
(74) *Attorney, Agent, or Firm*—Sofer & Haroun, LLP

(57) ABSTRACT

A method of issuing a ticket, paid for with illegal payment means during a transaction between a user and a ticket vending machine, where if the payment means are identified as being illegal, the printed ticket is marked in such a manner as to enable the marked ticket to be distinguished from a regular ticket during an inspection operation.

10 Claims, 3 Drawing Sheets

METHOD OF ISSUING A TICKET PAID FOR BY ILLEGAL PAYMENT MEANS, AND A VENDING MACHINE AND TICKET READER FOR IMPLEMENTING THE METHOD

RELATED APPLICATIONS

The present application is a national phase application of PCT/FR2004/001540, which in turn claims the benefit of priority from French Patent Application No. 03 07426, filed on Jun. 19, 2003, the entirety of which are incorporated herein by reference.

FIELD OF THE INVENTION

The invention relates to a method of issuing a ticket paid for with illegal payment means during a transaction between a user and a ticket vending machine.

SUMMARY

The invention relates more particularly to a method of issuing a ticket paid for with illegal payment means during a transaction between a user and a ticket vending machine, at the end of which transaction the machine issues a ticket to the user in exchange for payment using payment means, the machine including means for detecting illegal payment means, and the method being of the type in which the transaction comprises in succession:

a payment step during which the user pays for the ticket by using a payment means;

a checking step during which the machine checks that the payment means used are regular;

if the payment means are checked as being regular, there follows a printing step of printing the ticket during which a regular ticket is printed on a blank ticket or medium; and thereafter the method includes an issuing step of issuing the ticket to the user.

BACKGROUND OF THE INVENTION

Ticket vending machines are generally to be found in public places so as to used by anybody.

The vending machine includes a dialog interface enabling a user, during a transaction, to select a ticket which the machine issues in exchange for payment. The payment means used may be coins or bank cards, for example. For this purpose, the machine includes means for receiving the payment means, e.g. a coin mechanism or a bank card reader.

It can happen that a user makes fraudulent use of illegal payment means for paying for the ticket. Such illegal payment means may be forged coins or a stolen bank card, for example.

It is therefore known for the vending machine to include means for detecting illegal payment means, i.e. means for detecting regular payment.

In one known method, when the machine detects that the payment means being used are illegal, the machine refuses the payment. The transaction is thus that the cheat then cannot obtain the desired ticket.

However, the illegal payment means are returned to the cheat who can then reuse them, e.g. with another vending machine. The cheat thus remains anonymous, and is likely to repeat the fraud on a machine that does not have means for detecting the illegal payment means.

OBJECTS AND SUMMARY OF THE INVENTION

In order to solve this problem, the invention proposes a method of the above-described type, characterized in that when the payment means are checked as being illegal, the printed ticket is marked in such a manner as to enable the marked ticket to be distinguished from a regular ticket during an inspection operation.

According to other characteristics of the invention:

the ticket is marked in a manner that is immediately visible;

the marked ticket includes at least one additional symbol compared with a regular ticket;

the marked ticket includes at least one symbol fewer than a regular ticket;

the marked ticket includes at least one symbol that is modified compared with a regular ticket;

the marked ticket includes an invisible mark;

the mark is made visible by prolonged exposure of the ticket to normal atmospheric or light conditions; and the ticket carries information stored in magnetic form, and it includes special magnetic information, and the inspection operation is performed by a ticket reader.

The invention also provides a vending machine for implementing the method, characterized in that it includes means for issuing a warning signal for the attention of a supervisor.

Finally, the invention provides a ticket reader, characterized in that it includes means for issuing a warning signal for the attention of a supervisor.

BRIEF DESCRIPTION OF THE DRAWINGS

Other characteristics and advantages of the invention appear on reading the following description, in which, for proper understanding, reference is made to the accompanying drawings, in which.

DETAILED DESCRIPTION

Figure 1:
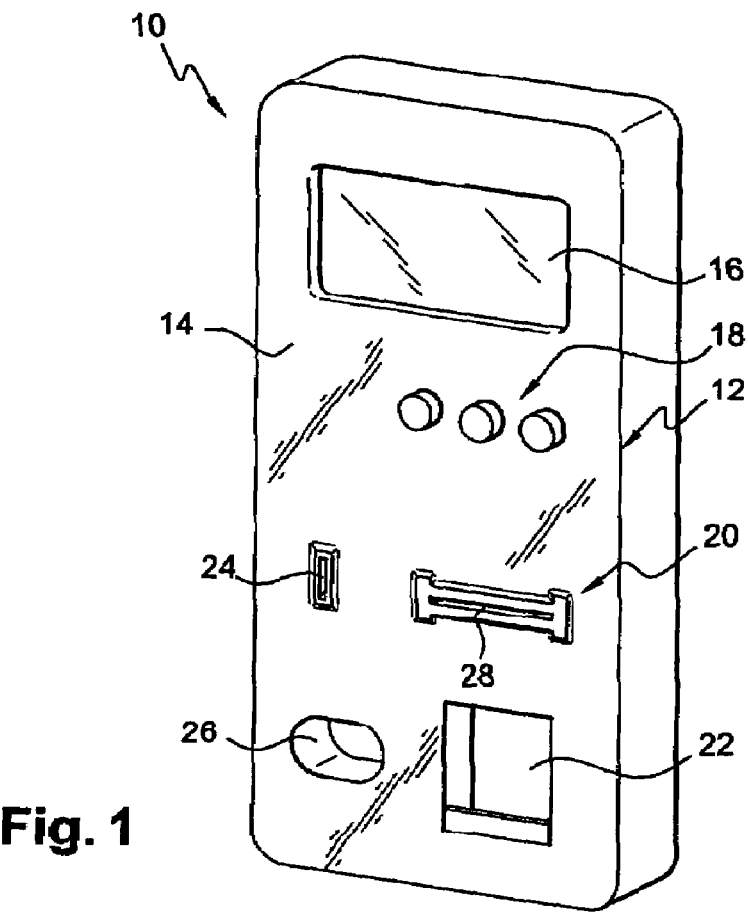
FIG. 1 is a perspective view showing a ticket vending machine for implementing the method in accordance with the teaching of the invention.
Figure 2:
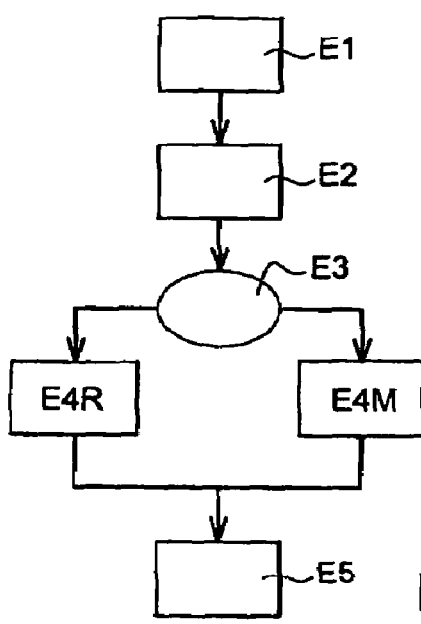
FIG. 2 is a flow chart showing the main steps of the method of issuing a ticket in accordance with the teaching of the invention as implemented by the machine of FIG. 1.

FIG. 1 shows a ticket vending machine 10. The machine 10 is a machine for issuing "pay-and-display" tickets for parking a motor vehicle.

The machine 10 has an interface 12 for dialog between the user and the machine 10. The interface 12 in this example is in the form of a transverse vertical wall 14 having arranged thereon information communications members 16, parameter selection members 18, payment members 20, and a ticket dispenser 22.

In known manner, the communications members 16 comprise a top screen. The screen 16 displays information about the transaction.

The payment members 20 in this example comprise a vertical slot 24 for inserting coins into a coin mechanism. The user can thus pay for a ticket by inserting coins into the slot 24. A bowl 26 that is arranged under the slot 24 is used for returning change to the user when the user does not have the exact money.

The interface 12 includes a horizontal slot 28R for inserting a payment card, e.g. a bank card (not shown).

The ticket dispenser 22 in this example is arranged under the horizontal slot 28R. It serves to issue tickets printed by the machine.

The machine 10 also has means (not shown) for detecting illegal payment means. Thus, the machine can recognize forged coins, a fake bank card, or indeed a stolen bank card.

In a known design, the transaction between the user and the machine 10 comprises five successive steps:

- a first step E1 of selecting a ticket, during which the user selects the desired ticket by using the parameter selection members 18;
- a second step E2 of payment, during which the user makes use of the payment means 20 to pay for the ticket, e.g. with its price being displayed on the screen 16;
- a third step E3 of checking, during which the machine 10 uses detector means to check that the payment means are regular;
- a fourth step of printing the ticket, during which the ticket is printed on a blank ticket; and
- finally a fifth step E5 of dispensing the ticket to the user.

Figure 3:
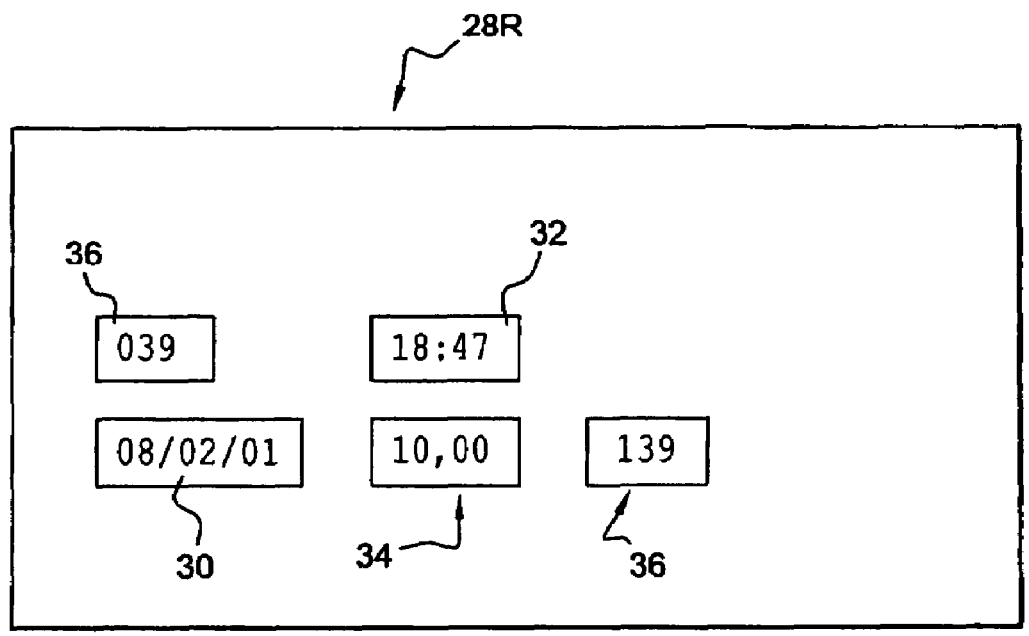
FIG. 3 is a face view showing a regular ticket issued by the FIG. 1 machine using the method of FIG. 2 when the payment means used by the user have been checked as being regular by the machine.

When the payment means have been checked and found to be regular by the machine 10, then the ticket printed during the printing step E4R is a regular ticket 28R. FIG. 3 shows one such regular ticket 28R as a non-limiting example.

The regular ticket 28R carries information necessary to enable it to be inspected, for example a date 30 and a time 32 corresponding to the time the ticket 28R was purchased, the price 34 of the ticket 28R, and various other items of information 36.

According to the teaching of the invention, when the payment means are found to be illegal by the machine 10, then the ticket printed during printing step E4M is a marked ticket 28M. The ticket 28M is marked in such a manner as to be distinguishable from a regular ticket 28R during an inspection operation.

Figure 4:
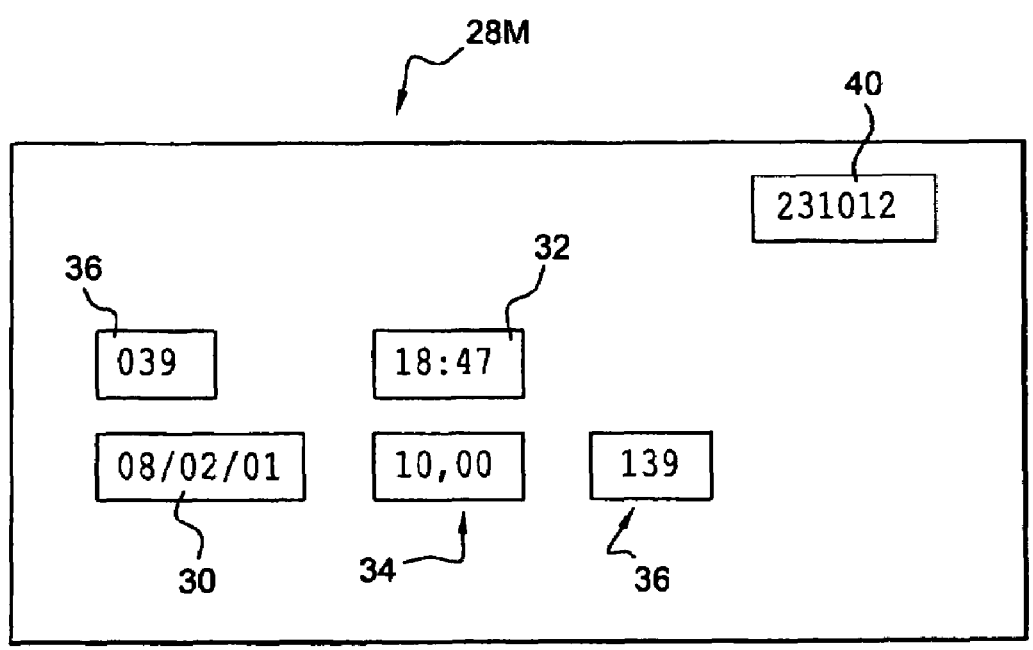
FIG. 4 is a view similar to FIG. 3, showing a marked ticket that is issued when the payment means used by the user have been checked as being fraudulent.

One such ticket 28M is shown in FIG. 4. The marked ticket 28M has a mark 40 which in this case is in the form of a series of digits that is not present on a regular ticket 28R. In general, the ticket 28M is marked in a manner that is made visible by the presence of at least one additional symbol compared with a regular ticket 28R. When an inspector performs an inspection operation, the inspector can recognize the marked ticket 28M as being obtained illegally.

Advantageously, the mark 40 carried by the ticket 28M is selected in such a manner that the overall appearance of the marked ticket 28M is similar to that of the regular ticket 28R. Thus a user who is not aware of the exact differences in appearance between a regular ticket 28R and a marked ticket 28M will not spot the difference between a regular ticket 28R and a marked ticket 28M by casual visual examination.

In a first variant of the method (not shown), the mark 40 draws the user's attention to the fact that the user is not entitled to sell the marked ticket 28M on fraudulently to a third party.

Figure 5:
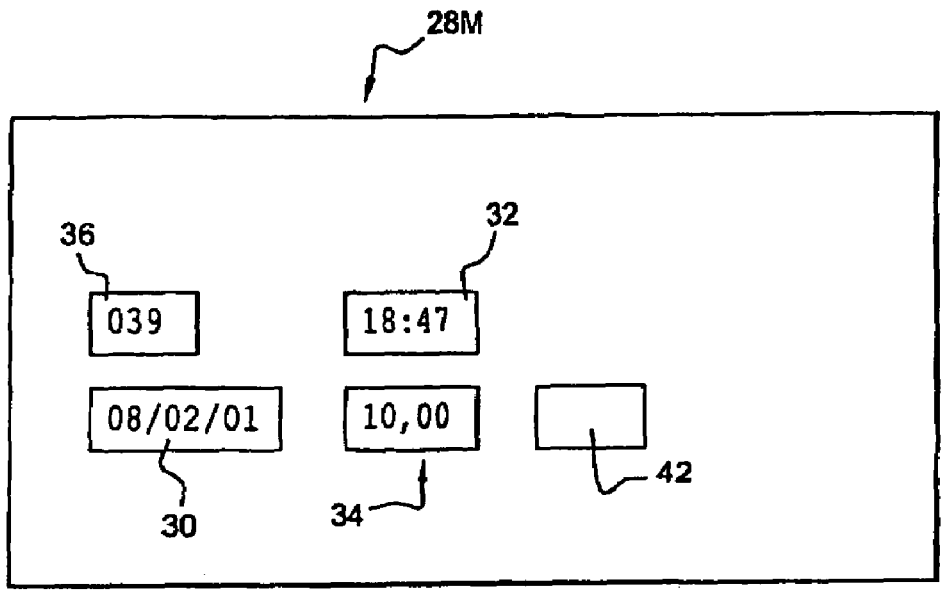
FIG. 5 is a view similar to FIG. 4 showing a variant of a marked ticket.

In a second variant of the invention, as shown in FIG. 5, the marked ticket 28M includes at least one symbol 42 fewer than the regular ticket 28R. For example, as shown in FIG. 5, the ticket does not have the reference 36 that is normally present on a regular ticket 28R.

Figure 6:
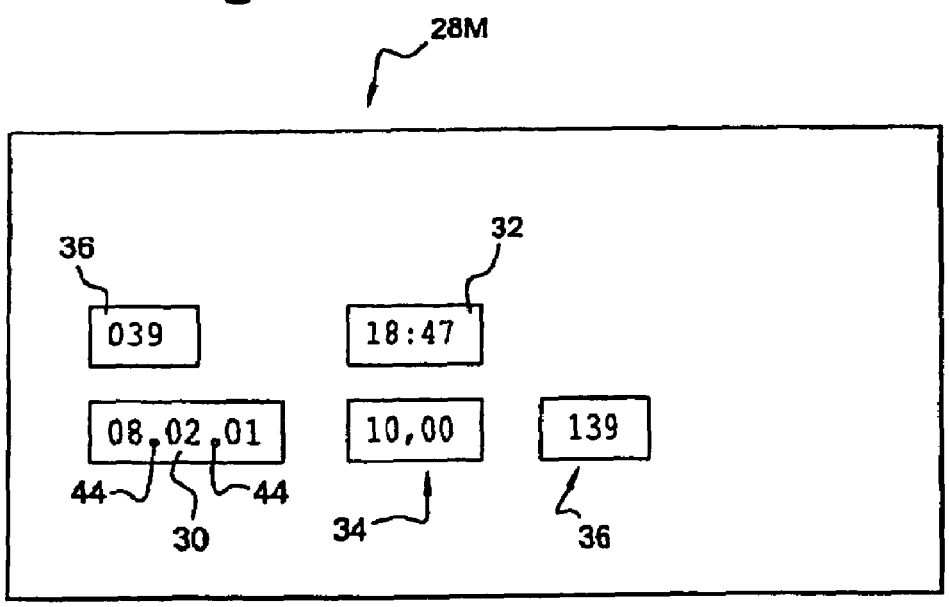
FIG. 6 is a view similar to FIG. 4 showing a variant of a marked ticket.

In a third variant of the invention shown in FIG. 6, the marked ticket 28M includes a symbol 44 that is modified compared with a regular ticket 28R.

In a fourth variant of the invention (not shown), the marked ticket 28M includes an additional mark that is not normally visible, but that will appear after the ticket has been exposed for a long time to air or to higher than a certain temperature, or under special lighting. For example the additional mark may be printed using so-called "sympathetic" ink.

According to another aspect of the invention, the machine 10 includes means for issuing a warning signal to a supervisor when the payment means being used have been checked as being illegal.

For example, the machine 10 can transmit electromagnetic waves to a receiver situated in a surveillance station. The supervisors warned by the signal can then go at once to the vending machine and inspect the person in possession of a ticket and identify the marked ticket 28M.

Figure 7:
FIG. 7 is a face view showing a ticket that includes a magnetic stripe.

In a second implementation of the invention shown in FIG. 7, the machine 10 normally issues regular tickets 46R that include a magnetic stripe 48. The information needed for inspecting the ticket is stored in magnetic form on the magnetic stripe 48.

Such a ticket 46R is designed to be inspected by a specific reader.

When the machine 10 detects illegal payment means, the issued ticket 46M includes a mark stored in magnetic form in the stripe 48. The ticket 46M as marked in this way can be distinguished from a regular ticket 46R by the reader.

The reader is programmed to perform a determined action on detecting a marked ticket 46M.

Advantageously, the reader is fitted with means for issuing a warning signal for the attention of a supervisor. For example, if the reader serves to open a barrier that prevents exit from a supervised paid-for car park, then the use of a marked ticket 46M does not cause a barrier to be opened, and causes a warning signal to be issued for the attention of the security guard.

By means of this invention, a user found, on being inspected, to be in possession of a ticket 28M or 46M marked in accordance with the teaching of the invention is liable to be punished if the user is the cheat or to provide information about the identity of the cheat if the marked ticket 28M or 46M was purchased from the machine 10 by a third party.

The invention claimed is:

1. A method of issuing a ticket paid for with illegal payment means during a transaction between a user and a ticket vending machine, at the end of which transaction the machine issues a ticket to the user in exchange for payment using payment means, the machine including means for detecting illegal payment means, said method comprising the steps of:

paying for the ticket by the user using a payment means;
   checking that the payment means used are regular, by the machine;
   if the payment means are checked as being regular, printing the ticket, during which a regular ticket is printed on a blank ticket or medium;
   issuing the ticket to the user; and
   if the payment means are checked as being illegal, a printed ticket is marked in such a manner as to enable the marked ticket to be distinguished from a regular ticket during an inspection operation.

2. A method according to claim 1, wherein the ticket is marked in a manner that is immediately visible.

3. A method according to claim 2, wherein the marked ticket includes at least one additional symbol compared with a regular ticket.

4. A method according to claim 2, wherein the marked ticket includes at least one symbol fewer than a regular ticket.

5. A method according to claim 2, wherein the marked ticket includes at least one symbol that is modified compared with a regular ticket.

6. A method according to claim 1, wherein the marked ticket includes an invisible mark.

7. A method according to claim 6, wherein the mark is made visible by prolonged exposure of the ticket to normal atmospheric or light conditions.

8. A method according to claim 7, of the type in which the ticket carries information stored in magnetic form, the method being characterized in that the marked ticket includes special magnetic information, and in that the inspection operator is performed by a ticket reader.

9. A vending machine for implementing the method according to claim 1, wherein it includes means for issuing a warning signal for the attention of a supervisor.

10. A ticket reader according to claim 8, wherein it includes means for issuing a warning signal for the attention of a supervisor.

* * * * *